(No Model.)
P. CASAMAJOR.
FILTERING SACCHARINE SOLUTIONS, &c.
No. 270,634. Patented Jan. 16, 1883.
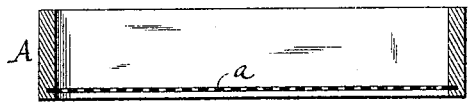
Attest:
Courtney A. Cooper
F. E. Hansmann
Inventor:
Paul Casamajor
By his attorney
Charles E. Foster

UNITED STATES PATENT OFFICE.

PAUL CASAMAJOR, OF BROOKLYN, NEW YORK.

FILTERING SACCHARINE SOLUTIONS, &c.

SPECIFICATION forming part of Letters Patent No. 270,634, dated January 16, 1883.

Application filed May 19, 1882. (No model.)

*To all whom it may concern:*

Be it known that I, PAUL CASAMAJOR, of Brooklyn, Kings county, New York, have invented a new and useful Improvement in Filtering Saccharine Solutions and other Liquids, of which the following is a specification.

My invention relates to the filtering of saccharine solutions and of other liquids holding in suspension such solid matters as form deposits on filtering-surfaces, which, in ordinary modes of filtering, clog and obstruct such surfaces in a very short time.

In the drawing the figure represents in section one form of apparatus adapted to be used in carrying out my invention.

To filter liquids of this nature very extensive filtering-surfaces are required.

Liquids are often filtered under high pressure, as is the case in using filter-presses; but this cannot be done with liquids of the class mentioned above, as increased pressure with such liquids is powerless to increase filtration to any marked degree.

To filter liquids of this class with limited filtering-surfaces, I mix them thoroughly with a certain amount of sawdust, (or woody matter in a comminuted state,) which so changes the nature of the deposit on the filtering-surfaces that the latter do not become quickly clogged and obstructed, and allow of the filtration of an increased quantity of liquid. The sawdust, wood-raspings, ground wood, or other comminuted woody material is first thoroughly cleansed by boiling in hot water, by treating with chemicals, or otherwise, removing the volatile and extractive portions, is then washed and soaked in clear water, and about two per cent. of this is added to the ordinary solution, which is then forced through the cloth in the press, as usual, or is poured into a box, A, having a bottom sieve of fabric, a wire-cloth, or perforated plate; or it may be extracted by centrifugal action.

Whatever may be the means employed, I have found that the mixing of sawdust with the liquid and subsequent separation greatly facilitate the extraction of foreign particles and enable me to remove all foreign matters with great rapidity and most effectually.

Liquids treated as above can be forced through filter-presses and other filters working under pressure.

I claim—

The within-described improvement in filtering liquids, the same consisting in mixing therewith a small quantity of sawdust and then filtering the liquid so mixed through sieves, fabrics, or other filtering materials, substantially as set forth.

In testimony whereof I have signed my name to this specification in the presence of two subscribing witnesses.

PAUL CASAMAJOR.

Witnesses:
OSWALD ROTHMALER,
CHARLES E. SAFFORD.